(12) United States Patent
Casey et al.

(10) Patent No.: US 6,452,695 B1
(45) Date of Patent: Sep. 17, 2002

(54) SYSTEM AND METHOD FOR ENABLING AN IMAGE INPUT DEVICE AND A PRINTER TO OPERATE AS A DIGITAL COPIER

(75) Inventors: Ronald Charles Casey, Lexington; Thomas Anthony Knight, Nicholasville; Paul Michael Ramey, Lexington; Ronald William Schlentner, Richmond; Timothy Wayne Tillotson, Georgetown; Stephen Ray Wilson, Mt. Sterling; Aaron Charles Yoder; Samuel William Gardiner, both of Lexington, all of KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/065,702

(22) Filed: Apr. 24, 1998

(51) Int. Cl.[7] .................................................. G06F 3/12
(52) U.S. Cl. ....................... 358/1.6; 358/1.15; 358/407; 399/139
(58) Field of Search ..................... 358/1.1, 1.6, 1.12, 358/1.13, 1.14, 1.15, 1.16, 1.17, 400, 407, 408, 442, 468; 399/139, 144, 151; 710/8, 10, 37, 38, 131

(56) References Cited

U.S. PATENT DOCUMENTS

| | | |
|---|---|---|
| 4,754,300 A | 6/1988 | Fukae |
| 4,814,798 A | 3/1989 | Fukae et al. |
| 4,959,731 A | 9/1990 | Fukae |
| 4,991,108 A | 2/1991 | Hamilton .................... 358/1.15 |
| 5,075,874 A | 12/1991 | Steeves et al. .............. 358/1.13 |
| 5,107,338 A | 4/1992 | Saito ........................... 358/296 |
| 5,138,702 A * | 8/1992 | Tada ............................ 710/37 |
| 5,235,674 A * | 8/1993 | Cohen-Skalli et al. ....... 358/1.1 |
| 5,239,621 A | 8/1993 | Brown, III et al. ......... 358/1.16 |
| 5,339,432 A | 8/1994 | Crick ............................. 713/1 |
| 5,361,134 A | 11/1994 | Hu et al. |
| 5,371,574 A | 12/1994 | Ohmura et al. .............. 358/468 |
| 5,410,642 A | 4/1995 | Hakamatsuka et al. ..... 358/1.14 |
| 5,425,135 A | 6/1995 | Motoyama et al. ......... 358/1.15 |
| 5,459,579 A | 10/1995 | Hu et al. |
| 5,481,742 A * | 1/1996 | Worley et al. ................ 358/1.1 |
| 5,502,797 A | 3/1996 | Bush et al. ................. 358/1.16 |
| 5,555,435 A | 9/1996 | Campbell et al. ........... 358/1.13 |
| 5,651,114 A | 7/1997 | Davidson, Jr. .................. 702/5 |
| 5,701,492 A | 12/1997 | Wadsworth et al. ........... 717/11 |
| 5,732,199 A | 3/1998 | Kuo et al. ................... 358/1.15 |
| 5,818,606 A | 10/1998 | Muramatsu et al. |
| 5,930,553 A * | 7/1999 | Hirst et al. ...................... 399/8 |
| 5,933,580 A * | 8/1999 | Uda et al. ................... 358/1.15 |

OTHER PUBLICATIONS

Brochure on the Avision ScanCopier by Avision Inc., Hsinchu, Taiwan, R.O.C.

* cited by examiner

*Primary Examiner*—Mark Wallerson
(74) *Attorney, Agent, or Firm*—Needle & Rosenberg, P.C.

(57) ABSTRACT

An adapter device is provided for connection to a printer and an image input device, such as a document scanner or digital camera, that enables the printer to operate as a digital copier for image data received from the image input device. The adapter device includes an input/output controller, memory and a processor. The input/output controller controls the exchange of information with the printer and with the image input device. The memory buffers input device driver software for the image input device and printer driver software for the printer, and also stores image data output by the image input device. The processor is responsive to commands made from a control panel to initiate operation of the image input device under control of the input device driver software. The processor also processes image data from the image input device under control of the printer driver software and generates printer data to be printed by the printer.

27 Claims, 3 Drawing Sheets

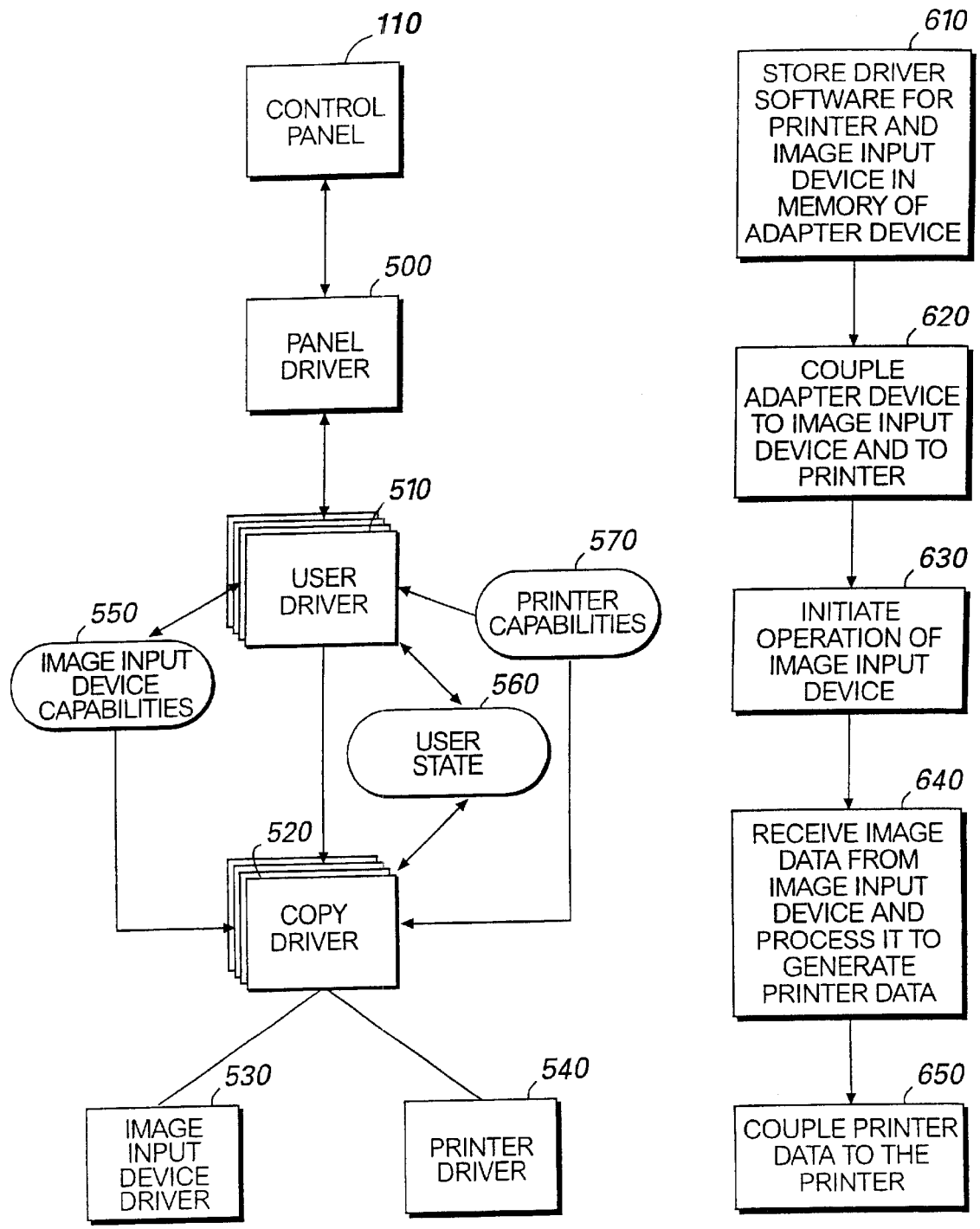

SYSTEM AND METHOD FOR ENABLING AN IMAGE INPUT DEVICE AND A PRINTER TO OPERATE AS A DIGITAL COPIER

BACKGROUND OF THE INVENTION

1. Field of the Invention

This invention relates generally to digital copying, and generally to the field of devices called multifunction peripherals (MFPs). More specifically, the present invention relates to an adapter device suitable for enabling an electronic printer to operate as a digital copier for image data provided by an image input device, such as a scanner or digital camera.

2. Related Art

Traditional photocopy machines are analog devices. An original document is scanned and analog signals representative of that document are generated to create a duplicate of it using photostatic principles. In traditional photocopiers, the analog signal information cannot be conveniently stored, given the analog nature of these signals. By contrast, a digital copier is essentially a photocopier machine that converts the scanned image of the document into a digital data format suitable for storage. One significant advantage of a digital copier is that it can produce an unlimited number of copies from one scan of the original.

Multifunction peripherals (MFPs) are peripheral devices that are capable of performing several related tasks, such as document scanning, printing, duplicating, and facsimile transmission and reception. For example, a digital scanner and printer are commonly integrated into a single device. Printing and scanning can each be carried out by utilizing just one component of the integrated device, while both components are used for copying. An example of an integrated printer-scanner is the Medley™ printer/copier manufactured and marketed by Lexmark International Inc.

A disadvantage of an MFP is its lack of flexibility. Consumers that already own a printer or scanner cannot upgrade it to an MFP. Conversely, in some cases, the quality of one or more components of an MFP may match a consumer's need in the short-run, but a higher-quality component perhaps with more features may later be desired. For example, the printer component of a scanner-printer MFP may be satisfactory for simple letter writing, but not for high quality graphics.

An alternative to a single integrated MFP is to attach multiple peripheral devices to a host system, such as a computer or a computer network. In one respect, this allows for the greatest flexibility insofar as different components can be selected to suit the needs of the user(s). However, this solution increases the workload of the host system, whether it be a stand-alone computer or computers connected to a computer network. Furthermore, if for some reason access is not available to the host system due to malfunction, maintenance, etc., the component peripherals cannot be used.

SUMMARY OF THE INVENTION

The present invention is directed to a device which overcomes the problems described above, and accordingly provides a solution in which individual peripheral components suitable to specific needs can be selected. Furthermore, a host standalone or network computer system is not required for the digital copier operation.

Briefly, the present invention is directed to an adapter device for connection to a printer and to an image input device, such as a document scanner or digital camera, which enables the printer to operate as a digital copier for image data received from the image input device. The adapter device may comprise one or more input/output controllers, memory and a processor. The input/output controllers manage the exchange of information between the printer and the image input device. The memory stores input device driver software for the image input device and printer driver software for the printer, and it also buffers image data output by the image input device. In addition, the adapter device includes a control panel through which a user initiates the copy process. User interface controls, such as buttons, and a display are provided on the control panel. Commands or stimuli are generated in response to actuation of the buttons. The status of the process is displayed on the control panel display.

In operation, the processor is responsive to external commands or stimuli from the control panel to initiate operation of the image input device under control of the input device driver software. The processor processes image data from the image input device under control of the printer driver software for generating printer data to be printed by the printer.

The driver software for the printer and the image input device is stored in the adapter device, rather than on a host computer or network. Accordingly, the printer and image input device can be upgraded independently, and the new driver software is installed into the adapter device when an upgrade is made. Moreover, the adapter device includes all of the control hardware and software necessary to operate the printer as a digital copier, thereby eliminating the need for a host computer or network to achieve the digital copier operation.

The above and other objects and advantages of the present invention will become more readily apparent when reference is made to the following description, taken in conjunction with the accompanying drawings.

BRIEF DESCRIPTION OF THE DRAWINGS

FIG. 3 is a flow chart illustrating the overall operation of the adapter device according to the present invention.

FIG. 4 is a chart depicting steps of a method of interfacing an image input device and a printer, according to the present invention.

DETAILED DESCRIPTION OF THE DRAWINGS

Figure 1:
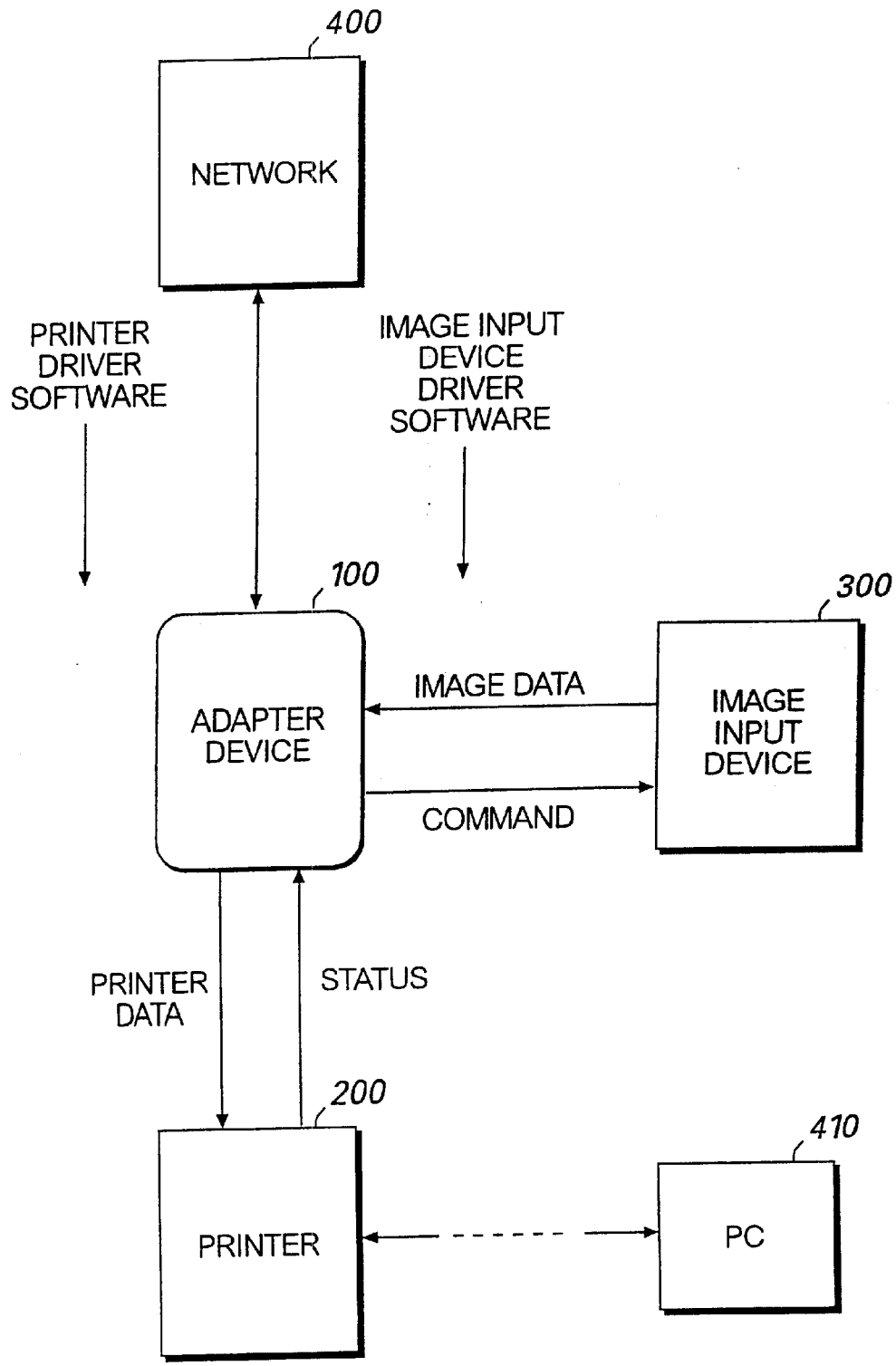
FIG. 1 is a block diagram generally showing the use of an adapter device according to the present invention to enable a printer to operate as a digital copier for image data supplied by an image input device.

Referring first to FIG. 1, the adapter device, shown at reference numeral 100, is designed for use in an environment or system including a printer 200 and an image input device 300. The image input device 300 is, for example, a document scanner (color or black-and-white), a digital camera or other device capable of providing image data to be duplicated. The adapter device 100 interconnects the printer 200 and the image input device 300, and performs several functions, including user interface, control of the image input device 300, and presentation of the image data to the printer 200 (as printer data). The adapter device 100 effectively "pulls" image data from the image input device 300 to be printed by the printer 200. The printer 200 is any conventional electronic printer, such as an ink-jet printer, laser printer, dot matrix printer, etc.

To this end, the adapter device 100 stores input device driver software to operate the image input device 300 and printer driver software to operate the printer 200. This software is installed in the adapter device 100 via a computer network 400, for example, that includes one or more computers from which the driver software is downloaded. Alternatively, the input device driver software and printer driver software may be installed via the printer 200 into the adapter device 100 from a stand-alone personal computer (PC) 410 that is connected to the printer 200.

Figure 2:
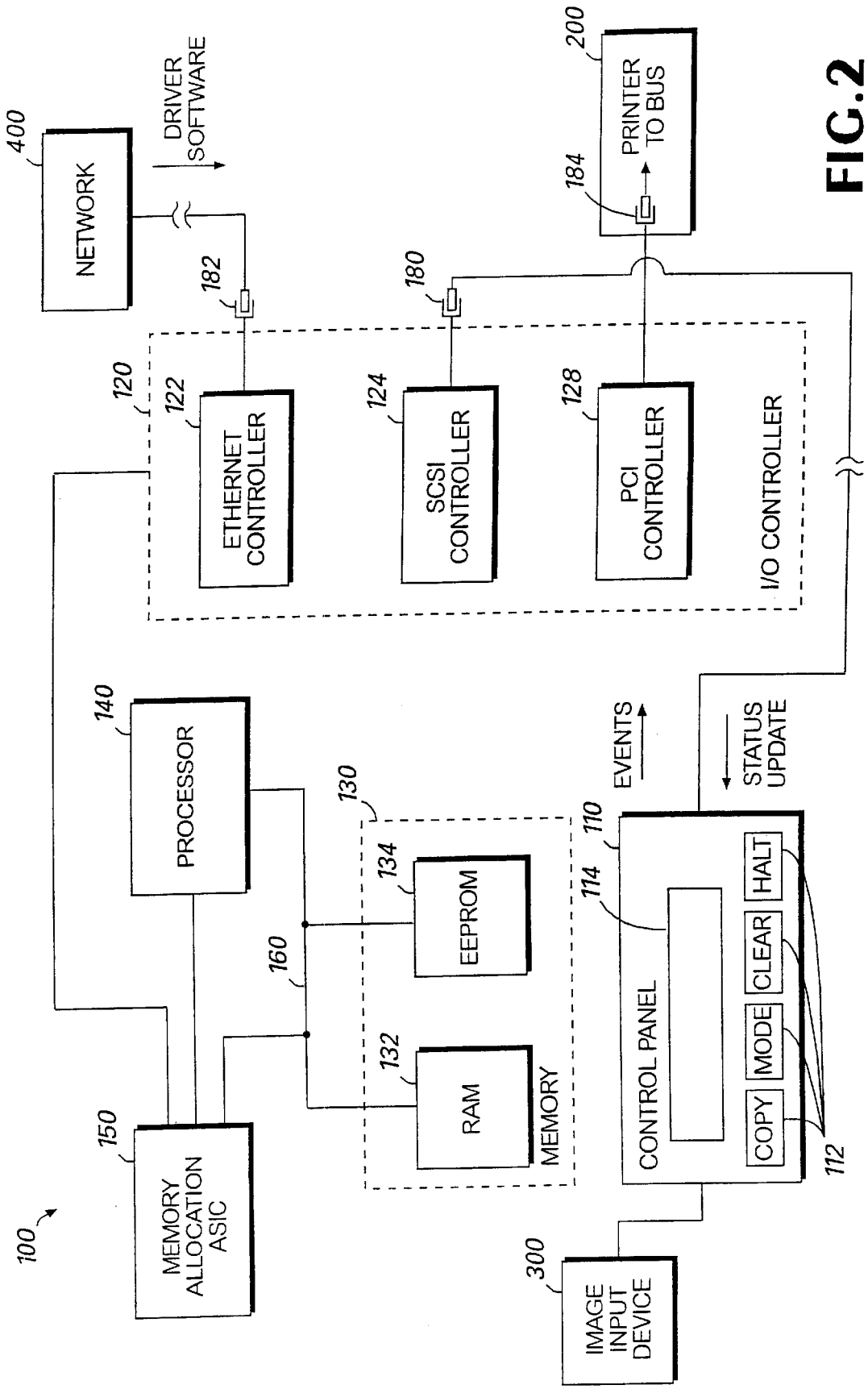
FIG. 2 is a detailed block diagram of the adapter device according to the present invention.

Turning to FIG. 2, the adapter device 100 will be described in greater detail. The adapter device comprises a control panel 110 that includes user interface controls for issuing commands to operate a printer as a digital copier. An input/output (I/O) controller 120 is provided to control the exchange of information between the adapter device 100 and the printer 200, the image input device 300, and the network 400. In addition, the I/O controller 120 controls the exchange of information between the control panel 110 and other components of the adapter device 100. Memory 130 is provided for storing input device driver software for the image input device 300 and printer driver software for the printer 200, and for buffering image data output by the image input device 300 prior to it being processed and forwarded to the printer 200. A central processing unit (hereinafter "processor") 140 is provided for controlling the overall operation of the adapter device 100. Finally, a memory allocation application specific integrated circuit (ASIC) 150 is provided to dynamically control how access to the memory 130 is granted for the I/O controller 120 and the processor 140.

The control panel 110 includes buttons 112 that function as user interface controls to generate commands (stimuli) for operating the image input device 300 and the printer 200. In addition, the status of the copying process and other related information is displayed on a display 114 of the control panel 110.

The I/O controller 120 is the connection point to the control panel 110, the printer 200, the image input device 300 and the network 400, and controls the exchange of information to and from the adapter device 100. More specifically, the I/O controller 120 comprises several controllers, including an Ethernet controller 122, a small computer system interface controller (SCSI) 124, and a peripheral connection interface (PCI) controller 128. The Ethernet controller 122 controls the exchange of information with the network 400, such as for receiving the driver software for the printer 200 and for the image input device 300. The SCSI controller 124 controls the exchange of information with the image input device 200, and with the control panel 110. The image input device 300 and the control panel 110 are connected in a "daisy chain" configuration to the SCSI controller 124, as is standard with SCSI devices. The PCI controller 128 controls the exchange of information with the printer 200. These I/O controllers are examples only, and other architecture bus standards may be incorporated into the design and operation of the input/output controller 120.

The functions of two or more of the I/O controllers may be combined into a single application specified integrated circuit. For example, the function of one or more of the Ethernet controller 122, SCSI controller 124 or PCI controller 128 may be combined into a single circuit together with the function of the memory allocation ASIC 150.

Furthermore, the control panel 110 may be connected to a serial port of the printer 200, or integrated into the control panel of the printer. In this case, commands from the control panel are coupled to the processor 140 via the connection between the printer 200 and the adapter device 100.

The memory 130 is coupled to the I/O controller 120 and to the processor 140, and serves two primary functions. First, the memory 130 stores the input device driver software for the image input device 300 and the printer driver software for the printer 200. The input device driver software includes the various instructions required to initiate operation of the image input device 300 and to receive the image data generated by the image input device 300. Similarly, the printer driver software includes the various instructions necessary to supply printer data to the printer 200. Normally, these driver software modules are stored in an attached computer. In accordance with the present invention, however, the driver software is stored in the adapter device 100 so as to allow the printer to operate as a digital copier, independent from a stand-alone (host) computer or a computer network.

Second, the memory 130 buffers (temporarily stores) the image data that is received from the image input device 300 to enable the generation of corresponding printer data under control of the printer driver software.

Accordingly, the memory 130 preferably includes two memory modules 132 and 134. A random access memory (RAM) module 132 is provided for buffering image data and other information incident to the generation of printer data from the image data. Data that is received by the I/O controller 120 (the SCSI controller 124 in particular) for processing by the adapter device 100 is buffered in the RAM 132, access to which is granted by the memory allocation ASIC 150. An electronically erasable programmable read only memory (EEPROM) module 134 (or equivalent) is provided for storing the input device driver software and the printer driver software. The EEPROM 134 is a "flash" memory that enables the driver software for the printer and/or the image input device to be changed as the printer and/or image input device hardware is changed, or to update those software modules as may be necessary with or without accompanying hardware changes. The Ethernet controller 122 of the I/O controller 120 detects when new or updated driver software is being downloaded, and rewrites the content of the EEPROM 124 with the new or updated driver software. Alternatively, as described above, the driver software may be installed via the printer 200 through the PCI controller 128.

The processor 140 comprises a microprocessor, for example, and controls the operation of the adapter device 100 with the driver software stored in the EEPROM 134. The processor 140 is coupled to the memory 130 through the memory allocation ASIC 150 and to the I/O controller 120. Data is exchanged between the various components within the adapter device 100 via a data bus 160, which interconnects the processor 140, memory 130 and I/O controller 120. The processor 140 is responsive to commands from the control panel 110 to initiate operation of the image input device 300 under control of the input device driver software. In addition, the processor 140 processes image data received from the image input device 300 under control of the printer driver software to generate printer data appropriate for the image, to be printed by the printer 200.

The adapter device 100 is preferably packaged such that all of the components, with the exception of the control panel 110, are contained within a housing or on a relatively compact peripheral card device. The adapter device includes several connection ports (connectors), a connection port 180 for the SCSI connection to the control panel 110 and the image input device 300 "daisy chain" connected thereto, a connection port 182 for connection to the network 400, and a connection port 184 for connection to the printer 200. The connections are made by standard connectors, which may vary depending on the bus architecture employed. For example, the adapter device 100 may be configured as a peripheral card device that fits into a suitable bus slot, such as a PCI bus slot, of the printer 200. Accordingly, connection port 184 associated with the PCI controller 128 may be a PCI bus connector shown in FIG. 2 that fits into such a bus slot to connect the adapter device 100 to the bus of the printer. Alternatively, the adapter device 100 may be coupled by a parallel or serial cable interface to the printer 200. Still further, the adapter device 100 can be integrated within a printer 200 or within an image input device 300 to enable direct connection between the peripheral devices (without the need for a host computer) thereby imparting the capability of the digital copier operation described herein.

The control panel 110 is preferably kept separate from the housing or card package of the other components of the adapter device 100 so that it can be located in a convenient location, near the image input device 300 or printer 200, for ease of use. Alternatively, the control panel can be packaged together with the other components, in a more fixed configuration.

With reference to FIG. 1, set-up of the adapter device 100 will now be described. During set-up, the adapter device 100 is connected to the image input device 300 and printer 200 as explained above. Power supply for the adapter may be provided by a separated dedicated supply, or it may be derived from a power supply of either the printer 200 or image input device 300, as is well known in the art.

The driver software, which may be distributed on diskette, CD-ROM, via the World Wide Web of the Internet, etc., (if not already resident in the memory of the adapter device 100) is installed into the adapter device 100 from a computer that is part of the network 400, or from a stand-alone PC 410 connected to the printer 200. The input device driver software and printer driver software are both specific to the type and model of the image input device and printer employed. The driver software is written into the EEPROM 134 of the adapter device 100, thereby configuring it to operate with a particular printer and a particular image input device. Once the driver software is installed, operation of the printer 200 as an enabled digital copier may begin.

With reference to FIG. 3, the operation of the adapter device 100 is described in terms of the various software modules and data structures that operate it. In FIG. 3, a panel driver is shown at reference numeral 500, a user driver is shown at reference numeral 510, a copy driver is shown at reference numeral 520, the image input device driver (input device driver software) is shown at reference numeral 530 and the printer driver (printer driver software) is shown at reference numeral 540.

There are also several data structures that store parameters used for controlling the operation of the image input device 300 and printer 200. An image input device capabilities data structure 550 defines the operation parameters of the image input device 300. A user state data structure 560 contains status information, such as copy count, scale factor of the duplication, and other similar data. A printer capabilities data structure 570 defines the basic operation parameters of the printer 200. The data structures 550 and 570 are included within the input device driver software and printer driver software respectively as they are unique to a particular image input device or a particular printer. However, some information within data structures 550 and 570 is dynamically acquired from the image input device and printer, respectively.

The panel driver 500 is a set of functions that issues commands to the control panel 110 over the SCSI controller 124 to turn on lights, display text of the display 114, receive button events, etc. Alternatively, the panel driver 500 can be used to drive a graphical control panel simulation for display on a portable laptop computer, from which the copying process is controlled. The user driver 510 includes the intelligence that interprets and responds to button events from the control panel 110. The responses that may be generated include updating the user state data structure 560, changing the state of lights and content of the display 114 on the control panel 110, etc. The responses that are generated by the user driver 510 depend on the capabilities of the printer and of the image input device defined by the data structures 550 and 570. For example, the image to be printed can be enlarged or reduced.

The copy driver 520 is responsible for invoking the image input device driver 530 and printer driver 540 in order to operate the image input device and printer to make photocopies of an image generated and supplied as output by the image input device. The copy driver 520 is responsive to the user driver 510 only insofar as a copy function is initiated. All other control between the user driver 510 and the copy driver 520 is through the user state data structure 560.

When a copy is initiated on the control panel 110, the user driver 510 detects the button event and in response triggers the copy driver 520 to invoke the image input device driver 530 to initiate operation of the image input device 300. For example, if the image input device 300 is a document scanner, the scanning process will begin. When the image data from the image input device 300 is received by the adapter device 100, the copy driver 520 invokes the printer driver 540 to generate printer data appropriate for the image data, in order to cause the printer 200 to print that image. The printer can print multiple copies of the image, if desired, based on the print data maintained in the memory 130 (particularly the RAM 132) for that copying event. The number of copies printed, size of the copy printed, scale, etc., are all controlled via the user state data structure 560, within the confines of the features and capabilities of the image input device and printer, defined by the image input device capabilities data structure 550 and printer capabilities data structure 570.

With reference to FIG. 4 in conjunction with FIG. 3, the steps of a method of interfacing an image input device and a printer according to the present invention will be described. Step 610 depicts storing input device driver software 530 for the image input device 300 and printer driver software 540 for the printer 200 in a memory 134 of an adapter device 100. In step 620, the adapter device 100 is coupled to the image input device 300 and to the printer 200. Steps 610 and 620 may be performed in the order shown, or step 620 may be performed before step 610. In step 630, operation of the image input device 300 is initiated by way of the image input device driver software. In step 640, the image data from the image input device 300 is received and processed in the adapter device 100 to generate printer data. In step 650, the printer data is coupled to the printer 200. As described above, step 610 of storing the driver software for the image input device and the printer may involve storing the driver software in an erasable programmable memory. In addition, the step of initiating operation of the image input device may involve actuating buttons on a control panel coupled to a processor in the adapter device 100, whereby the processor is responsive to commands generated by actuation of the buttons in order to initiate operation of the image input device and the printer.

The adapter device 100 according to the present invention provides significant flexibility in the selection of a printer and/or image input device, and enables the printer to operate as a digital copier. The driver software for the image input device 300 or printer 200 can be independently upgraded with hardware upgrades. In addition, because all of the driver software for the printer 200 and image input device 300 reside in the adapter device 100, the digital copier function is provided without use of a host computer or computer network. Consequently, host processing resources are not occupied nor are they required during a photocopy process.

The above description is intended by way of example only, and is not intended to limit the present invention in any way, except as set forth in the following claims.

What is claimed is:

1. An adapter device for enabling a printer to operate as a copier for image data received from an image input device, the adapter device being selectively coupled to a host, the adapter device comprising:
   (a) an input/output controller for controlling the exchange of information with the image input device and with the printer; and
   (b) a means for downloading from the host computer input device driver software for the image input device and printer driver software for the printer; and
   (c) a memory for storing the input device driver software and the printer driver software, and for buffering image data output by the image input device; and
   (d) a processor coupled to the memory and to the input/output controller, the processor being responsive to commands to initiate operation of the image input device under control of the input device driver software, and to process image data from the image input device under control of the printer driver software to generate printer data suitable for printing by the printer without using processing resources of a host computer.

2. The adapter device of claim 1, further comprising a control panel coupled to the processor via the input/output controller, the control panel comprising user interface controls for issuing said commands to operate the image input device and the printer.

3. The adapter device of claim 2, wherein the user interface controls of the control panel comprise a plurality of buttons and a display, wherein the processor is responsive to said commands that are generated in response to actuation of one of the plurality of buttons, and the processor generates status information for display on the display of the control panel.

4. The adapter device of claim 1, wherein the memory comprises an erasable and programmable memory module that is capable of being rewritten with input device driver software for a particular image input device.

5. The adapter device of claim 1, wherein the memory comprises an erasable and programmable memory module that is capable of being rewritten with printer driver software for a particular printer.

6. The adapter device of claim 1, wherein the memory comprises a random access memory module for storing the image data.

7. The adapter device of claim 1, and further comprising a connection port for connecting to the image input device.

8. The adapter device of claim 7, and wherein the input/output controller comprises a small computer system (SCSI) controller for controlling the exchange of information with the image input device.

9. The adapter device of claim 8, and further comprising a control panel having user interface controls for issuing commands to operate the image input device and the printer, wherein the SCSI controller controls the exchange of information with the control panel.

10. The adapter device of claim 9, wherein the control panel comprises a plurality of buttons and a display, wherein the processor is responsive to commands generated in response to actuation of one of the plurality of buttons, and the processor generates status information for display on the display of the control panel.

11. The adapter device of claim 1, and further comprising a connection port for connecting to a computer network from which the input device driver software and printer driver software are downloaded for installation in the memory.

12. The adapter device of claim 11, and further comprising an Ethernet controller for controlling the exchange of information with the computer network.

13. The adapter device of claim 1, and further comprising a bus connector for connecting to a bus of the printer for exchanging information therewith.

14. In combination, the adapter device of claim 1 and a printer, wherein the input/output controller is coupled to a bus of the printer for exchanging information therewith.

15. A system for interconnecting a printer and an image input device, comprising:
   (a) an image input device capable of supplying output image data to be copied;
   (b) a printer capable of printing print data supplied as input thereto;
   (c) an adapter device for connection between the image input device and the printer, the adapter device comprising:
      (i) an input/output controller for controlling the exchange of information with the image input device and with the printer;
      (ii) memory for storing input device driver software for the image input device and printer driver software for the printer, and for buffering image data output by the image input device;
      (iii) a processor coupled to the memory, the processor being responsive to external commands to initiate operation of the image input device under control of the input device driver software, and to process image data from the image input device under control of the printer driver software for generating printer data to be printed by the printer; and
      (iv) a means for downloading from a host computer input device driver software for the image input device and printer driver software for the printer.

16. The system of claim 15, wherein the image input device is a scanner.

17. The system of claim 15, wherein the image input device is a digital camera.

18. The system of claim 15, wherein the adapter device further comprises a control panel connected to the input/output controller and comprising user interface controls for issuing commands to operate the image input device and the printer.

19. The system of claim 15, wherein the control panel of the adapter device comprises a plurality of buttons and a display, wherein the processor is responsive to said commands that are generated in response to actuation of one of the plurality of buttons, and generates status information for display on the display of the control panel.

20. The system of claim 15, and wherein the adapter device comprises a connection port for connecting to a computer network from which the input device driver software and printer driver software are downloaded for installation in the memory.

21. A method for enabling a printer to operate as a copier for image data generated by an image input device without using processing resources of a host computer, the method comprising steps of:
   (a) downloading from a host computer input device driver software for the image input device and printer driver software for the printer;
   (b) storing input device driver software associated with the image input device and printer driver software associated with the printer in an adapter device connected between the image input device and the printer, the adapter device having a processor and a memory;
   (c) initiating operation of the image input device under control of the input device driver software;
   (d) receiving image data from the image input device and processing the image data under control of the printer driver software to generate printer data; and
   (e) coupling the printer data to the printer.

22. The method of claim 21, wherein the step of storing comprises storing the input device driver software and printer driver software in an erasable programmable memory.

23. The method of claim 21, wherein the step of initiating operation of the image input device comprises actuating buttons on a control panel coupled to the processor, wherein the processor is responsive to commands generated by actuation of the buttons in order to initiate operation of the image input device and the printer.

24. A device for enabling a printer to operate as a copier for image data received from an image input device, the device comprising:
   (a) control panel means comprising user interface controls for issuing commands to operate the image input device and the printer; and
   (b) processor means coupled to the control panel means and responsive to commands to initiate operation of the image input device, and to process image data from the image input device to generate printer data suitable for printing by the printer without using processing resources of a host computer;
   (c) means for downloading from the host computer input device driver software for the image input device and printer driver software for the printer.

25. The device of claim 24, wherein the user interface controls of the control panel means comprise a plurality of buttons and a display, wherein the processor means is responsive to said commands that are generated in response to actuation of one of the plurality of buttons, and the processor means generates status information for display on the display of the control panel means.

26. The device of claim 24, and further comprising memory means coupled to said processor means, the memory means comprising an erasable and programmable memory module that is capable of being rewritten with input device driver software for a particular image input device and with printer driver software for a particular printer.

27. The device of claim 26, wherein the memory means comprises a random access memory module for buffering image data output by the image input device.

* * * * *